United States Patent
Borgwardt

(10) Patent No.: US 11,152,778 B2
(45) Date of Patent: Oct. 19, 2021

(54) LOW-VOLTAGE CIRCUIT BREAKER AND METHOD

(71) Applicant: Siemens Aktiengesellschaft, Munich (DE)

(72) Inventor: Andre Borgwardt, Schoenwalde-OT Paaren (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 130 days.

(21) Appl. No.: 16/507,591

(22) Filed: Jul. 10, 2019

(65) Prior Publication Data

US 2020/0021099 A1    Jan. 16, 2020

(30) Foreign Application Priority Data

Jul. 12, 2018   (DE) ...................... 10 2018 211 646.6

(51) Int. Cl.
*H02H 3/08* (2006.01)
*H01H 71/02* (2006.01)
*H02H 1/00* (2006.01)

(52) U.S. Cl.
CPC .............. *H02H 3/08* (2013.01); *H01H 71/02* (2013.01); *H02H 1/0007* (2013.01)

(58) Field of Classification Search
CPC ......... H02H 3/08; H02H 1/0007; H01H 71/02
(Continued)

(56) References Cited

U.S. PATENT DOCUMENTS 5,220,479 A * 6/1993 Fraisse ................... H02H 3/006
340/664
5,311,392 A * 5/1994 Kinney ................ H02H 3/0935
361/87

(Continued)

FOREIGN PATENT DOCUMENTS

CN    101309004 A    11/2008
CN    101809704 A     8/2010
(Continued)

OTHER PUBLICATIONS

Chinese Office Action and English translation thereof dated Apr. 6, 2021.

*Primary Examiner* — Thienvu V Tran
*Assistant Examiner* — Sreeya Sreevatsa
(74) *Attorney, Agent, or Firm* — Harness, Dickey & Pierce, P.L.C.

(57) ABSTRACT

At least one example embodiment provides a low-voltage circuit breaker for interrupting a low-voltage circuit. The low-voltage circuit breaker includes at least one first current sensor configured to determine a magnitude of an electrical current of the low-voltage circuit, an interruption unit with contacts configured to interrupt the low-voltage circuit, an electronic trip unit connected to the first current sensor and the interruption unit and configured in such a way that an interruption of the low-voltage circuit is instigated upon current or/and current period limit values being exceeded, and a power supply unit configured to supply power to the electronic trip unit and to at least one additional component of the low-voltage circuit breaker, wherein a second current sensor is between the power supply unit and the at least one additional component, said second current sensor configured to determine the magnitude of the current of the additional component.

14 Claims, 2 Drawing Sheets

(58) Field of Classification Search
USPC .......................................................... 361/87
See application file for complete search history.

(56) References Cited

U.S. PATENT DOCUMENTS

| | | | |
|---|---|---|---|
| 6,804,101 B2* | 10/2004 | Tignor .................. | H02H 3/006 361/93.2 |
| 2007/0188954 A1* | 8/2007 | Wiese ............... | H02J 13/00017 361/62 |
| 2010/0207712 A1 | 8/2010 | Braune et al. | |
| 2012/0087053 A1* | 4/2012 | Mizui ..................... | G05F 1/573 361/93.7 |
| 2013/0329331 A1 | 12/2013 | Erger et al. | |
| 2014/0111898 A1 | 4/2014 | Williams et al. | |
| 2014/0226243 A1* | 8/2014 | Williams ................ | H02H 1/06 361/86 |

FOREIGN PATENT DOCUMENTS

| | | |
|---|---|---|
| CN | 101900771 A | 12/2010 |
| CN | 202888788 U | 4/2013 |
| CN | 105158684 A | 12/2015 |
| CN | 105429103 A | 3/2016 |
| DE | 19744207 A1 | 4/1999 |
| DE | 102007047166 A1 | 4/2009 |

\* cited by examiner

LOW-VOLTAGE CIRCUIT BREAKER AND METHOD

PRIORITY STATEMENT

The present application hereby claims priority under 35 U.S.C. § 119 to German patent application number DE 102018211646.6 filed Jul. 12, 2018, the entire contents of which are hereby incorporated herein by reference.

FIELD

Some example embodiments provide low-voltage circuit breakers for interrupting a low-voltage circuit and methods thereof.

SUMMARY

Circuit breakers are protective devices which function in a similar manner to a fuse. Circuit breakers monitor the current flowing through them using a conductor and interrupt the electrical current or energy flow to an energy sink or a load, which is referred to as tripping, if protective parameters such as current limit values or current period limit values, that is to say if a current value is present for a certain period, are exceeded. The current limit values or current period limit values set are corresponding reasons for tripping. The interruption is effected, for example, by means of contacts of the circuit breaker which are opened.

In particular for low-voltage circuits or networks, there are different types of circuit breakers depending on the magnitude of the electrical current provided in the electrical circuit. Circuit breaker may refer to switches such as are used in low-voltage installations for currents of 63 to 6300 amperes. More specifically, closed circuit breakers are used for currents of 63 to 1600 amperes, in particular of 125 to 630 or 1200 amperes. Open circuit breakers are used in particular for currents of 630 to 6300 amperes, such as 1200 to 6300 amperes.

Open circuit breakers are also referred to as air circuit breakers, ACB for short, and closed circuit breakers are referred to as molded case circuit breakers or compact circuit breakers, MCCB for short.

Low voltage is taken to mean, in particular, voltages of up to 1000 volts AC voltage or 1500 volts DC voltage. More specifically, low voltage may be voltages which are greater than an extra-low voltage having values of 50 volts AC voltage or 120 volts DC voltage.

In some example embodiments, circuit breakers have an electronic trip unit, ETU for short, which serves as a control unit.

At least one example embodiment provides a low-voltage circuit breaker for interrupting a low-voltage circuit including at least one first current sensor configured to determine a magnitude of an electrical current of the low-voltage circuit, an interruption unit with contacts configured to interrupt the low-voltage circuit, an electronic trip unit connected to the first current sensor and the interruption unit and configured in such a way that an interruption of the low-voltage circuit is instigated upon current or/and current period limit values being exceeded, and a power supply unit configured to supply power to the electronic trip unit and to additional components of the low-voltage circuit breaker.

At least one example embodiment provides a low-voltage circuit breaker for interrupting a low-voltage circuit. The low-voltage circuit breaker includes at least one first current sensor configured to determine a magnitude of an electrical current of the low-voltage circuit, an interruption unit with contacts configured to interrupt the low-voltage circuit, an electronic trip unit connected to the first current sensor and the interruption unit and configured in such a way that an interruption of the low-voltage circuit is instigated upon current or/and current period limit values being exceeded, and a power supply unit configured to supply power to the electronic trip unit and to at least one additional component of the low-voltage circuit breaker, wherein a second current sensor is between the power supply unit and the at least one additional component, said second current sensor configured to determine the magnitude of the current of the additional component, and the second current sensor is connected to evaluation electronics, the evaluation electronics configured to initiate an interruption of the current to the additional component upon a threshold value of the current of the additional component being exceeded.

At least one example embodiment provides method for a low-voltage circuit breaker including at least one first current sensor configured to determine a magnitude of the electrical current of the low-voltage circuit, an interruption unit with contacts configured to interrupt the low-voltage circuit, an electronic trip unit connected to the first current sensor and the interruption unit and configured in such a way that an interruption of the electrical circuit is instigated upon current or/and current period limit values being exceeded, and a power supply unit configured to supply power to the electronic trip unit and to additional components of the low-voltage circuit breaker, wherein the magnitude of the current of at least one additional component is determined continuously, is compared with a threshold value, and the current flow to the additional component is interrupted in the event of the threshold value being exceeded

BRIEF DESCRIPTION OF THE DRAWINGS

The described properties, features and advantages of example embodiments and the way in which they are achieved will become clearer and more clearly understood in association with the following description of the example embodiments which are explained in greater detail in association with the drawings and are not limiting the scope of the example embodiments.

DETAILED DESCRIPTION

Figure 1:
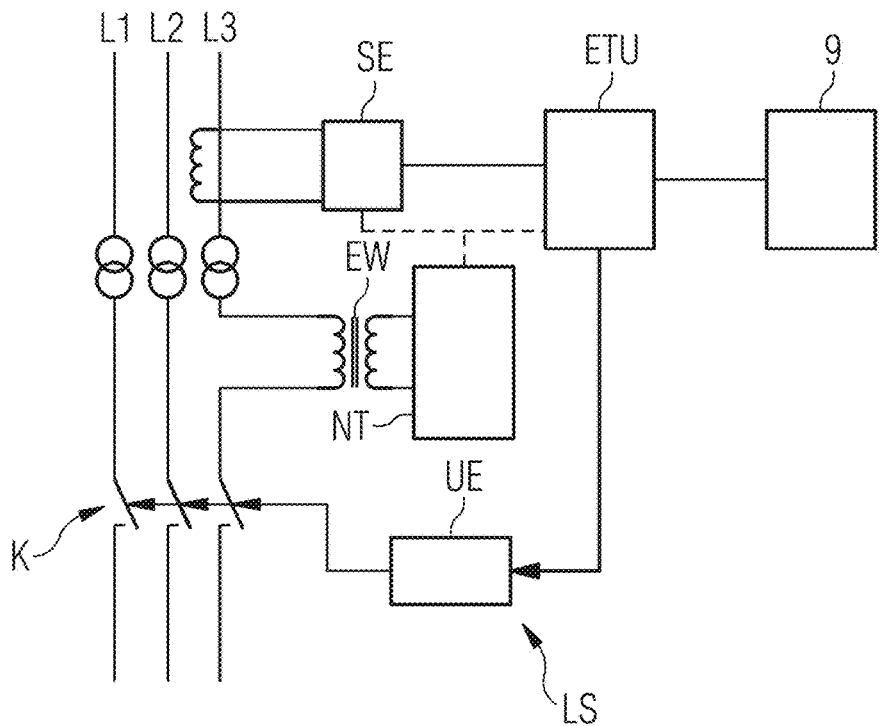
FIG. 1 shows a first illustration according to some example embodiments.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. Example embodiments, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Example embodiments may, however, be embodied in many alternate forms and should not be construed as limited to only the embodiments set forth herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the processing circuitry may be configured to execute the processor executable instructions.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In the event of an excessively high current flow, circuit breakers interrupt the circuit in accordance with their protective parameters or response values. The protective parameters or response values are the same or substantially the same as the magnitude of the current and the time after which the circuit is intended to be interrupted in the case of a persistently "high" current flow. In contrast to a fuse, these protective parameters or response values are settable in a circuit breaker, for example by the electronic trip unit. The electronic trip unit is usually fitted such that it is accessible via the front of the circuit breaker. The protective parameters are settable or parameterizable by the electronic trip unit.

Low-voltage circuit breakers have electronic components which are used for performing the function (protection). One component is the electronic trip unit. Depending on the parameterization, the electronic trip unit causes the circuit breaker to effect tripping (interruption of the circuit, opening of the contacts, disconnection of the network). A failure of the electronic trip unit results in the loss of the protective function of the low-voltage circuit breaker.

Circuit breakers comprising an electronic trip unit often have additional components. The additional components are usually connected to the electronic trip unit or directly connected to the power supply unit. Additional components can be, for example, a so-called rating plug, a switch identification module, SIM for short, or a display unit, in particular a display. The electronic trip unit often supplies the additional component(s) with energy.

If a fault or defect is present for example at an additional component, for example a short circuit in a display unit/display (module), as a result the energy supply of the electronic trip unit may be jeopardized, e.g. the energy supply may collapse, and the protective function of the circuit breaker may no longer be available as a result.

Some example embodiments provide an improved low-voltage circuit breaker to make a protective function available for an extended time in the event of possible defects.

According to some example embodiments, a second current sensor is provided between a power supply unit and at least one additional component, said second current sensor determining the magnitude of the current of the additional component. The second current sensor is connected to evaluation electronics, which initiate an interruption of the current to the additional component upon a threshold value of the current of the additional component being exceeded.

In this case, the current to the additional component can flow directly from the power supply unit to the additional component, and also via other units, such as the electronic trip unit, for example.

This has the particular advantage that the current flow to at least one additional component that is not needed for the protective function of a circuit breaker is monitored. An interruption of the current to the additional component is initiated in the event of a threshold value of the current to the additional component being exceeded. The magnitude of the threshold value is set or fixed so as to preclude or avoid a jeopardization of the energy supply of the electronic trip unit, in particular so as to ensure the protective function of the low-voltage circuit breaker to the greatest possible extent.

Advantageous configurations of example embodiments are specified in the dependent claims.

In at least one example embodiment, a disconnecting circuit is provided between the second current sensor and an additional component, said disconnecting circuit being connected to evaluation electronics, for the purpose of interrupting the circuit to the additional component in the event of the threshold value being exceeded.

This has the particular advantage of affording a simple solution for interrupting the current to the additional component.

In at least one example embodiment, the evaluation electronics are configured in such a way that the magnitude of the threshold value is settable, in particular a setting at the low-voltage circuit breaker is made possible.

This has the particular advantage that a flexible adaptation of the threshold value to different additional components and operating conditions is made possible.

In at least one example embodiment, the additional component is a rating plug, switch identification module or a display unit such as a display.

This has the particular advantage of increased monitoring for defects is provided for these units and maintenance of the protective function.

In at least one example embodiment, the low-voltage circuit breaker has a housing. Alternatively or additionally, an input unit is provided, permitting the magnitude of the threshold value to be settable.

This has the particular advantage that an external setting of the threshold value is made possible from outside or using a housing or an input unit.

In at least one example embodiment, the magnitude of the threshold value is fixed or is settable for each additional component. In particular, this is settable for each additional component the input unit.

This has the particular advantage that a specific limit value can be set or fixed individually for each additional component, such that in the event of failure of an additional component only the additional component is turned off and the function of the other additional components and also the protective function are maintained to the greatest possible extent.

Furthermore, methods according to example embodiments are claimed analogously advantageously.

All configurations, both in dependent form referring back to the independent patent claims, and referring back only to individual features or feature combinations of patent claims, bring about an improvement of a circuit breaker for maintaining the protective function to the greatest possible extent.

FIG. 1 shows an illustration according to example embodiments, which schematically shows a part of a low-voltage circuit breaker LS and various units of a circuit breaker being illustrated. FIG. 1 shows electrical conductors L1, L2, L3 of a low-voltage circuit, for example a three-phase AC circuit, wherein the first conductor L1 forms the first phase, the second conductor L2 forms the second phase and the third conductor L3 forms the third phase of the three-phase AC circuit. Furthermore, a neutral conductor and a protective conductor can also be provided.

In the example in accordance with FIG. 1, the third conductor L3 is connected to an energy converter EW, in such a way that at least part of the current, i.e. a conductor partial current, or the entire current of the third conductor flows through the primary side of the energy converter EW. The energy converter EW may be a transformer having a core. In one configuration, an energy converter EW can be provided in each phase or in each conductor of the electrical circuit. The secondary side of the energy converter EW or of each energy converter provided is connected to a power supply unit NT (or a plurality of power supply units), which makes available an energy supply, for example in the form of a supply voltage, for the electronic trip unit ETU together with additional components 9. The power supply unit NT may additionally also be connected to a first current sensor SE, for supplying energy to the first current sensor.

The first current sensor SE comprises at least one sensor element, for example a Rogowski coil, a measurement resistor/shunt, a Hall sensor or the like, for determining the magnitude of the electrical current of at least one conductor of the electrical circuit. In at least one example embodiment, the magnitude of the electrical current of each phase conductor or conductor of the electrical circuit is determined.

The first current sensor SE is connected to the electronic trip unit ETU and communicates to the electronic trip unit ETU the magnitude of the electrical current of at least one conductor, of the phase conductors or of all the conductors of the electrical circuit.

In the electronic trip unit ETU, the communicated current values are compared with current limit values or/and current period limit values which form reasons for tripping. In the event of said limit values being exceeded, an interruption of the electrical circuit is instigated. This can be done, for example, by virtue of the fact that an interruption unit UE is provided, which at one end is connected to the electronic trip unit ETU and at the other end has contacts K for interrupting the conductors L1, L2, L3 or further conductors of the electrical circuit. In this case, the interruption unit UE receives an interruption signal for opening the contacts.

Connected to the electronic trip unit ETU is one or a plurality of additional components 9. The plurality of additional components 9, for the purpose of energy supply, can be connected directly to the power supply unit NT or obtain the energy via the electronic trip unit ETU.

Figure 2:
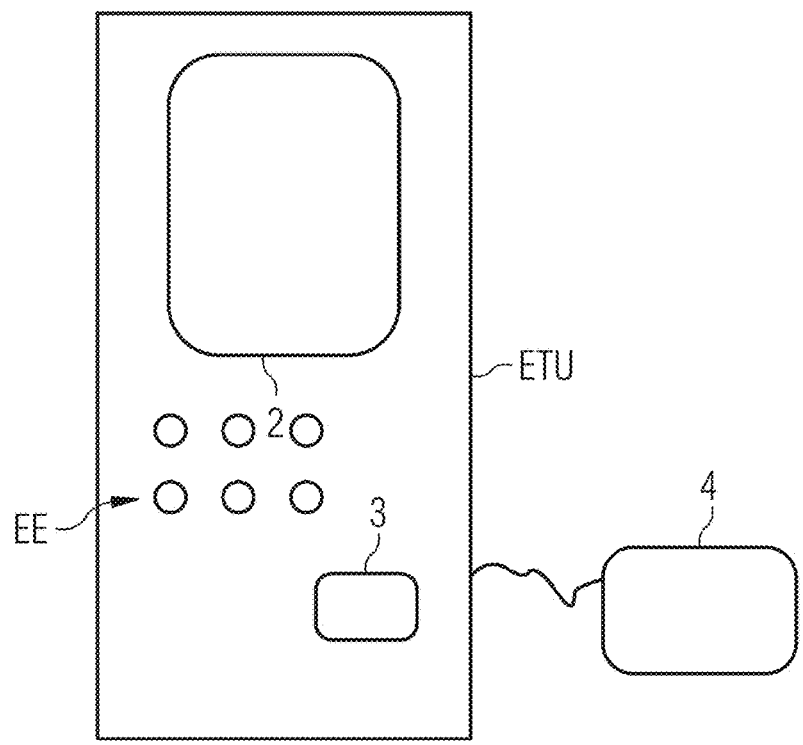
FIG. 2 shows a second illustration according to some example embodiments.

FIG. 2 shows an exemplary illustration of an electronic trip unit ETU. The electronic trip unit ETU comprises a housing, which can be part of a low-voltage circuit breaker, for example. The electronic trip unit ETU comprises an input unit EE, a display unit 2, in particular a display, a rating plug 3 and a switch identification module 4.

In this case, the display unit 2, rating plug 3 and switch identification module 4 are by way of example additional components according to some example embodiments.

Figure 3:
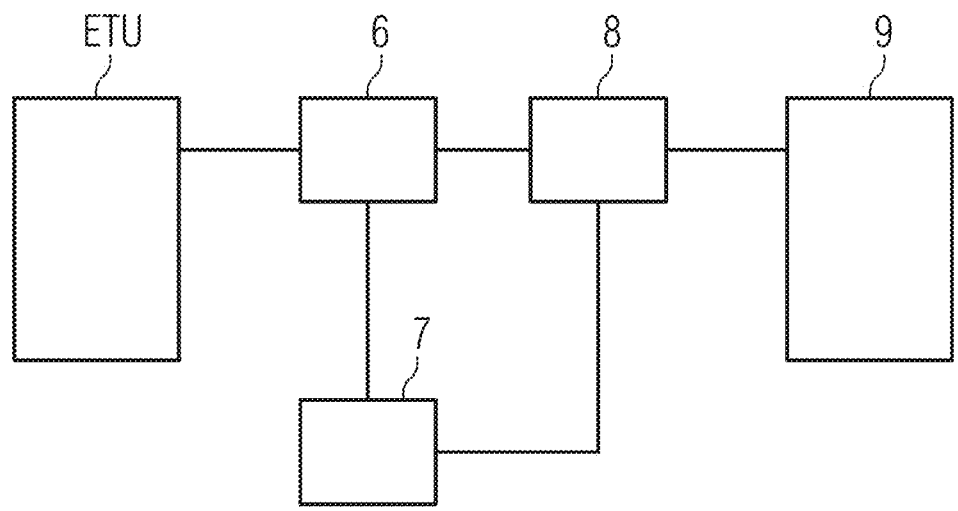
FIG. 3 shows a third illustration according to some example embodiments.

FIG. 3 shows an illustration of a configuration according to some example embodiments of a part of FIG. 1, specifically the (energy) connection between electronic trip unit ETU and an additional component 9. In this case, the additional component 9 obtains the energy via the electronic trip unit ETU, which in turn contains the energy from the power supply unit NT.

Between power supply unit NT and additional component 9, a second current sensor 6 is provided, in this example between electronic trip unit ETU and additional component 9. The second current sensor 6 determines the magnitude of the current of the additional component 9. The second current sensor 6 is connected to evaluation electronics 7, which initiate an interruption of the current to the additional component 9 in the event of a threshold value of the current of the additional component 9 being exceeded. For this purpose, by way of example, a disconnecting circuit 8 is provided between second current sensor 6 and additional component 9, said disconnecting circuit being connected to the evaluation electronics 7, for the purpose of interrupting the circuit to the additional component 9 in the event of the threshold value being exceeded.

Figure 4:
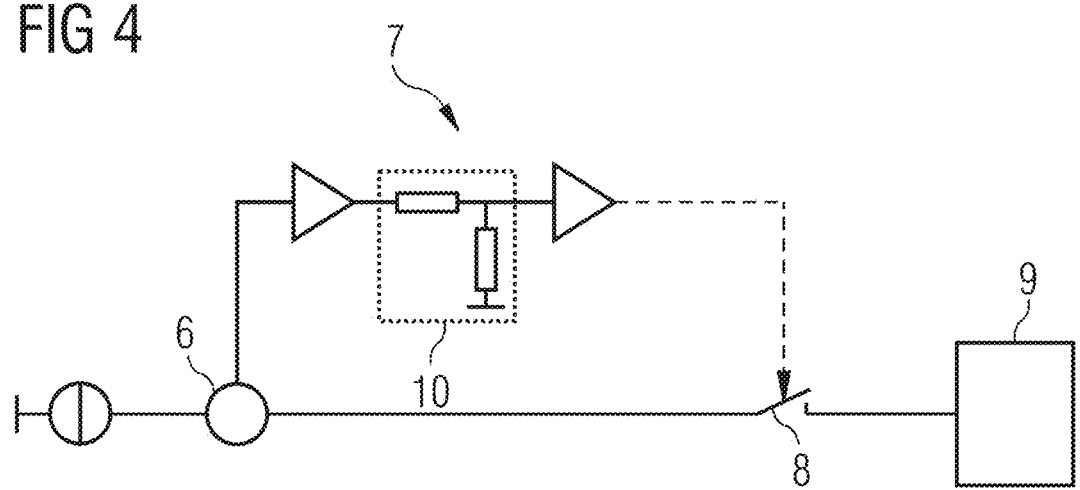
FIG. 4 shows a fourth illustration according to some example embodiments.

FIG. 4 shows one example of a more detailed configuration variant in accordance with FIG. 3. In this case, by way of example, the evaluation electronics 7 are illustrated in greater detail, comprising at least one amplifier, in particular two amplifiers, and a threshold value circuit, and also a setting possibility 10, by means of which the magnitude of the threshold value of the current to the additional component is settable.

Advantageously, a circuit of this type is provided for each additional component, wherein a different threshold value is settable or is fixed for each additional component.

Low-voltage circuit breakers have electronic components that are used for fulfilling the function (protection). One component is the electronic trip unit ETU. The electronic trip unit ETU evaluates measured currents and voltages. Depending on parameterization and event, the electronic trip unit ETU causes the low-voltage circuit breaker to effect tripping (interruption of the low-voltage circuit/disconnection of the network). A failure of the electronic trip unit ETU leads to loss of the protection function of the entire low-voltage circuit breaker. There are often connected to the electronic trip unit ETU additional components or additional devices, such as e.g. a rating plug 3, a switch identification module 4 or a display unit/display 2, which are supplied with energy via the electronic trip unit ETU or directly from the power supply unit NT.

If a defect, e.g. as a result of short circuit, is present for example at the display unit, e.g. at the connected display module, as a result the energy supply of the electronic trip unit ETU could collapse and the protection function would no longer be ensured.

In order to solve this problem, monitoring of the current flowing from the electronic trip unit ETU to the additional components 9 is carried out. For this purpose, e.g. a value equivalent to the current flowing is generated by a second current sensor, such as a measurement resistor or shunt, a Rogowski coil, a Hall sensor or other components or sensors for determining the magnitude of the current. Said value is interpreted with the aid of evaluation electronics 7. The evaluation electronics effect interruption if an excessively high current flows, e.g. by a disconnecting circuit 8, which prevents the current supply to the respective additional component 9, with the result that a collapse of the energy supply of the low-voltage circuit breaker is prevented and the protection function or protection functionality is maintained.

The threshold value that results in interruption can be fixed as desired, e.g. by a setting possibility 10, for example internally, or a setting unit EE, for example externally, which is accessible at the housing of the circuit breaker LS or the electronic trip unit ETU thereof.

It would even be conceivable to adapt said value to the circumstances in a variable manner (just in time), e.g. by a potentiometer, depending on the operating situation.

The advantage of the solution is that the example embodiments may function autonomously and rapidly. Furthermore, it is flexible in terms of design, can be adapted with a wide variety of response values for safeguarding the secondary side of the energy converter or power supply unit NT and is therefore suitable for use at peripheral interfaces—in particular independently of whether very small or large currents are to be detected. The solution operates absolutely nondestructively; normal operation is thus possible for example after the defective peripheral element has been exchanged. The functionality is suitable for low-energy systems such as e.g. in the case of self-supplied low-voltage circuit breakers. In contrast thereto, for normal fuses, and also for self-resetting fuses, for tripping the amount of energy present would be much too low or would take up considerable lengths of time, as a result of which the protection functionality of the overall device would no longer be ensured. A further advantage of example embodiments is an extremely low voltage drop, with the result that levels of the connected additional components or peripheral elements are uninfluenced or experience limited influence. If, in contrast thereto, e.g. semiconductor fuses were used, as a result a significant voltage drop would be generated, which could result in drive levels above the level of the operating voltage and the additional components could be damaged.

Although some example embodiments have been more specifically illustrated and described in detail, nevertheless example embodiments are not restricted by the examples disclosed, and other variations can be derived therefrom by the person skilled in the art, without departing from the scope of protection of example embodiments.

The invention claimed is:

1. A low-voltage circuit breaker for interrupting a low-voltage circuit, comprising:
   at least one first current sensor configured to determine a magnitude of an electrical current of the low-voltage circuit,
   an interrupter with contacts configured to interrupt the low-voltage circuit,
   an electronic trip connected to the first current sensor and the interrupter and configured such that an interruption of the low-voltage circuit is instigated upon at least one of a current limit value or current period limit values being exceeded, and
   a power supply configured to supply power to the electronic trip and to at least one additional component of the low-voltage circuit breaker, wherein
      a second current sensor is between the power supply and the at least one additional component, said second current sensor configured to determine a magnitude of a current of the at least one additional component, and
      the second current sensor is connected to evaluation electronics, the evaluation electronics configured to initiate an interruption of the current to the additional component upon a threshold value of the current of the additional component being exceeded.

2. The low-voltage circuit breaker as claimed in patent claim 1, wherein
a disconnecting circuit is provided between the second current sensor and the at least one additional component, said disconnecting circuit being connected to the evaluation electronics, the disconnecting circuit configured to interrupt the current to the at least one additional component when the threshold value is exceeded.

3. The low-voltage circuit breaker as claimed in claim 2, wherein
the evaluation electronics are configured such that a magnitude of the threshold value is settable.

4. The low-voltage circuit breaker as claimed in claim 2, wherein
the additional component is a rating plug, switch identification module or a display.

5. The low-voltage circuit breaker as claimed in claim 2, wherein
the low-voltage circuit breaker has a housing, and
an input is configured to set a magnitude of the threshold value.

6. The low-voltage circuit breaker as claimed in patent claim 1, wherein
the evaluation electronics are configured such that the magnitude of the threshold value is settable.

7. The low-voltage circuit breaker as claimed in claim 6, wherein
the additional component is a rating plug, switch identification module or a display.

8. The low-voltage circuit breaker as claimed in claim 1, wherein
the at least one additional component is a rating plug, switch identification module or a display.

9. The low-voltage circuit breaker as claimed in claim 1, wherein
the low-voltage circuit breaker has a housing, and
an input is configured to set a magnitude of the threshold value.

10. The low-voltage circuit breaker as claimed in claim 1, wherein
a magnitude of the threshold value is fixed or is settable for each of the at least one additional component.

11. A method for a low-voltage circuit breaker comprising
at least one first current sensor configured to determine a magnitude of an electrical current of the low-voltage circuit,
an interrupter with contacts configured to interrupt the low-voltage circuit,
an electronic trip connected to the first current sensor and the interrupter and configured such that an interruption of the low-voltage circuit is instigated upon at least one of a current limit value or a current period limit values being exceeded, and
a power supply configured to supply power to the electronic trip and to additional components of the low-voltage circuit breaker, the method comprising:
determining a magnitude of a current of at least one additional component of the additional components;
comparing the determined magnitude to a threshold value; and
interrupting the current to the at least one additional component when the threshold value is exceeded by the determined magnitude.

12. The method as claimed in claim 11, wherein the at least one additional component is a display, a rating plug or a switch identification module.

13. The method as claimed in claim 12, wherein
a different threshold value can be set for each of the at least one additional component.

14. The method as claimed in claim 11, wherein a different threshold value can be set for each of the at least one additional component.

* * * * *